United States Patent

Houck et al.

Patent Number: 6,148,264
Date of Patent: Nov. 14, 2000

[54] METHOD FOR REMOVING SEISMIC NOISE CAUSED BY EXTERNAL ACTIVITY

[75] Inventors: Richard T. Houck, Carrollton; Michael R. Jenkerson, McKinney; Stefan M. Seyb, Dallas, all of Tex.

[73] Assignee: ExxonMobil Upstream Research Company, Houston, Tex.

[21] Appl. No.: 09/110,575

[22] Filed: Jul. 6, 1998

[51] Int. Cl.[7] .................................................. G06F 19/00
[52] U.S. Cl. ............................................... 702/14; 702/6
[58] Field of Search .................................. 702/14, 17, 6; 367/51, 52, 60, 63, 47, 49, 46

[56] References Cited

U.S. PATENT DOCUMENTS

| | | | |
|---|---|---|---|
| 4,633,400 | 12/1986 | Chittineni | 364/421 |
| 4,937,794 | 6/1990 | Marschall et al. | 367/21 |
| 5,008,861 | 4/1991 | Gallagher | 367/59 |
| 5,237,538 | 8/1993 | Linville, Jr. et al. | 367/38 |
| 5,784,334 | 7/1998 | Sena et al. | 367/47 |
| 5,818,795 | 10/1998 | Hawkins et al. | 367/21 |
| 5,920,828 | 7/1999 | Norris et al. | 702/14 |

OTHER PUBLICATIONS

Berni, A. J. "*Automatic Surgical Blanking of Burst Noise in Marine Seismic Data*", 1987 SEG Meeting, New Orleans, Paper No. S 4.2 pp 477–478.

Akbulut, R.K; Saeland, O.K.; Farmer, P.A.; and Curitc, T. "*Suppression of Seismic Interference Noise on Gulf of Mexico Data*", 17th Annual Offshore Technology Conference, Houston, Texas (May 6–9, 1985) Paper No. OTC 4930, pp. 303–308.

*Primary Examiner*—Christine Oda
*Assistant Examiner*—Victor J. Taylor

[57] ABSTRACT

A method for analyzing a target seismic trace generally comprises selecting other traces in source-receiver space not including traces from the same shot record that contains the target trace, and comparing the selected traces to the target trace. The method generally includes setting a distance value indicative of the number of shot gathers to be considered in conjunction with analyzing a target trace, specifying which traces from a plurality of shot records to compare to the target trace based on the distance value, calculating a first amplitude value associated with the amplitude of the target trace, calculating a second amplitude value associated with the amplitudes of the specified comparison traces, and comparing the first amplitude value to the second amplitude value. The comparison and target traces can be analyzed in various windows of time. The target trace is modified in a suitable manner if it is found to contain noise. The preferred method can be implemented in a seismic processing system that is included onboard a seismic ship. Because the method does not require all of the seismic data to be acquired and then sorted before analyzed for noise, as is the case with many conventional trace editing techniques, the method of the preferred embodiment can be performed in near real or real-time. As such, real time data quality control is possible.

22 Claims, 7 Drawing Sheets

Microfiche Appendix Included
(1 Microfiche, 80 Pages)

METHOD FOR REMOVING SEISMIC NOISE CAUSED BY EXTERNAL ACTIVITY

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

This patent document includes a Microfiche appendix consisting of 1 microfiche with 80 frames.

COPYRIGHT AUTHORIZATION

A portion of the disclosure of this patent document contains material which is subject to copyright protection. Th e copy right owner has no objection to the facsimile reproduction by anyone of the patent document or the patent disclosure, as it appears in the Patent and Trademark Office patent files or records, but otherwise reserves all copyrights.

BACKGROUND OF THE INVENTION

1. Field of the Invention

The present invention generally relates to a method and apparatus for reducing the effect of unwanted noise in seismic data caused by nearby seismic or other noise-producing activity. More particularly, the present invention relates to reducing noise in marine seismic data caused by seismic activity from nearby seismic ships. Still more particularly, the present invention relates to eliminating noise from nearby seismic ships during real or near real-time data acquisition or in subsequent processing.

2. Background of the Invention

The field of seismology focuses on the use of artificially generated elastic waves to locate mineral deposits such as hydrocarbons, ores, water, and geothermal reservoirs. Seismology also is used for archaeological purposes and to obtain geological information for engineering. Exploration seismology provides data that, when used in conjunction with other available geophysical, borehole, and geological data, can provide information about the structure and distribution of rock types and contents.

Most oil companies rely on seismic interpretation to select sites for drilling exploratory oil wells. Despite the fact that the seismic data is used to map geological structures rather than find petroleum directly, the gathering of seismic data has become a vital part of selecting the site of exploratory and development wells. Experience has shown that the use of seismic data greatly improves the likelihood of a successful venture.

Seismic data acquisition is routinely performed both on land and at sea. At sea, a seismic ship deploys a streamer or cable behind the ship as the ship moves forward. The streamer includes multiple receivers in a configuration generally as shown in FIG. 1. Streamer 110 trails behind ship 100, which moves generally in the direction of the arrow 101. The streamer includes a plurality of receivers 114. As shown, a source 112 is also towed behind ship 100. Source 112 and receivers 114 typically deploy below the surface of the ocean 70. Streamer 110 typically includes electrical or fiber-optic cabling for interconnecting receivers 114 and seismic equipment on ship 100. Streamers are usually constructed in sections 25 to 100 meters in length and include groups of up to 35 or more uniformly spaced receivers. The streamers may be several miles long and often a seismic ship trails multiple streamers to increase the amount of seismic data collected. Seismic data acquisition involving a single streamer including a single source and multiple receivers is referred to as two-dimensional ("2D") seismic data acquisition. The use of multiple streamers and/or multiple sources is referred to as three-dimensional ("3D") seismic data acquisition. Data is digitized via electronic modules located near the receivers 114 and then the data is transmitted to the ship 100 through the cabling at rates of 7 (or more) million bits of data per second. Processing equipment aboard the ship controls operation of the trailing source and receivers and performs initial processing on the acquired data. The large volume of data acquired usually requires further processing in land-based computing centers after the seismic survey has completed.

Seismic techniques estimate the distance between the ocean surface 70 and subsurface structures, such a structure 60 which lies below the ocean floor 63. By estimating the distance to a subsurface structure, the geometry or topography of the structure can be determined. Certain topographical features are indicative of oil and/or gas reservoirs. To determine the distance to subsurface structure 60, source 112 emits seismic waves 115, which reflect off subsurface structure 60. The reflected waves are sensed by receivers 114. By determining the length of time that the seismic waves 115 took to travel from source 112 to subsurface structure 60, and to receivers 114, an estimate of the distance to subsurface structure 60 can be obtained.

The receivers used in marine seismology are commonly referred to as hydrophones, or marine pressure phones, and are usually constructed using a piezoelectric transducer. Synthetic piezoelectric materials, such as barium zirconate, barium titanate, or lead mataniobate, are generally used. A sheet of piezoelectric material develops a voltage difference between opposite faces when subjected to mechanical bending. Thin electroplating on these surfaces allows an electrical connection to be made to the device so that this voltage can be measured. The voltage is proportional to the amount of mechanical bending or pressure change experienced by the receiver resulting from seismic energy propagating through the water. Various configuration of hydrophones are used such as disk hydrophones and cylindrical hydrophones.

Two types of seismic sources are used to generate seismic waves for the seismic measurements. The first source type comprises an impulsive source which generates a high-energy, short time duration impulse. The time between emitting the impulse from the source and detecting the reflected impulse by a receiver is used to determine the distance to the subsurface structure under investigation. A second type of source generates lower magnitude, vibratory energy. The measurement technique that uses such sources is referred to as the marine vibratory seismic ("MVS") technique. Rather than imparting a high magnitude pressure pulse into the ocean in a very short time period, vibratory sources emit lower amplitude pressure waves over a time typically between 5 and 8 seconds, although longer time periods are also possible. Further, the frequency of the vibrating source varies from about 5 to 150 Hz, although the specific low and high frequencies differ from system to system. The frequency of the source may vary linearly or non-linearly with respect to time. The frequency variations are commonly called a "frequency sweep." The frequency sweep may thus be between 5 and 150 Hz and 5 to 7 seconds in duration. The magnitude of the seismic wave oscillations may vary or remain at a constant amplitude, but generally are much lower than the magnitude of impulsive sources.

The amount of data collected in a typical seismic survey can be voluminous. For example, a typical seismic survey may involve the mapping of a 1000 square mile region of the ocean by a 3D seismic ship trailing six or eight streamers. Each streamer may have 400 or 500 receivers attached to it. For each seismic measurement, 6–8 seconds of data (referred to as a "trace") is acquired and stored on magnetic tape on-board the ship. To completely map the survey area, which may require several weeks, one billion traces, or more, may be acquired and stored on tape. The traces are stored as "shot records" on the tape with a shot record representing the traces from all of the receivers from a single shot pulse from a source. This volume of data necessitates the use of thousands of magnetic tapes which are manually loaded into storage bins in the ship initially and then automatically accessed by specialized equipment on-board the ship during the survey. Because of the enormous volume of data acquired during a typical survey, improved techniques for efficiently processing the data are needed.

Some areas of the world are heavily explored so that several seismic ships, working for related or unrelated operators, may be conducting seismic surveys at the same time and in relatively close proximity to one another (within 50 miles or so). The receivers typically used in seismic streamer cables are highly sensitive as well as omnidirectional (sensitive to signals travelling from any direction). Virtually any sound that passes through the location of the receiver is detected by the receiver. Accordingly, the receivers respond not only to an impulse or "shock pulse" generated by their own ship, but may also respond to shots generated by another ship in the vicinity.

FIG. 2, for example, illustrates three seismic ships 20, 30, and 40 in the same general area of the ocean. As shown, seismic signals 31 and 41 generated by ships 30 and 40, respectively, propagate through the water to the receivers 114 on ship 20 as well as reflect off subsurface structures. To ships 30 and 40 their seismic signals 31, 41 represent desirable signals, but to ship 20 those signals represent undesirable noise. Additionally, there are other types of noise external to the seismic acquisition system of ship 20 that affect marine data acquisition. Examples of such noise include weather noise and "cultural" noise from rigs and shipping. All of these noises affect the cost and quality of seismic data by necessitating a relaxation in the specification for data quality control, by requiring that the data be re-acquired (re-shot), or requiring "time sharing" during which closely positioned seismic ships take turns acquiring seismic data to minimize noise on the seismic signals detected by each ship's seismic system. It thus is highly desirable to remove, or at least minimize, the noise present in a seismic signal that is generated from such external sources.

Several algorithms have been suggested for noise reduction. Some of these methods involve a process called "stacking" in which multiple traces are added together or otherwise combined into a single trace. In robust stacking methods high amplitude samples are discarded in the stacking process itself. Trace weighting methods are similar in approach to robust stacking, except that the traces are inversely weighted prior to stacking rather than selectively eliminated during stacking.

Adaptive-predictive methods, such as f–x deconvolution, reduce random noise by predicting coherent events. Since interference is random in common offset or CDP domains, random zones of high amplitude noise can be replaced on a per-sample basis with the surrounding acceptable data. Moveout filtering specifically targets coherent events. This method includes the well-known f–k filter and τ–p filter which depend on the signal and interference having different (and separable) "dips" in the common shot domain.

Trace editing techniques attempt to separate high amplitude zones from the surrounding signal. These zones then are either weighted down, blanked or replaced with neighboring data using an interpolation scheme. The present invention relates to an improvement in trace editing methodology.

Conventional trace editing methods generally require (1) all of the seismic data to be collected, (2) sorting the traces into an appropriate "domain," and then (3) removing the noise from the sorted traces. Conventional shot domain methods, while not requiring sorting, do not respond well to inherent variations in signal levels. In a 2D acquisition system, sorting the traces necessarily involves considerable time and processing power because of the volume of data. This processing usually occurs at a processing facility after the seismic survey has been completed. The processing burden is exacerbated in a 3D acquisition system which may involve sorting a billion traces or more. One of the most costly aspects of seismic data-processing involves playing back the traces from the magnetic tapes and storing the processed information back on tape. The processing of tens of thousands of magnetic tapes requires specialized equipment operating over a relatively long period of time and is extremely costly.

Because full seismic data processing is generally considered too expensive a task to be performed on the ship at sea, the seismic operators of the ship have little assurance regarding the quality of the data that they have collected. Quality control "stacks" which are generated on board typically are insufficient to properly evaluate the data degradation. It is not until after the survey has completed and the tapes are processed that the operators will know whether the data is good or not. Often times only select portions of the data may be infected with noise or otherwise corrupted. Reshooting bad sections of a seismic line generally is not economically feasible once the ship has left the survey area. It would be highly advantageous to be able to evaluate the data at sea in real-time, or near real-time, to be able to determine the quality of the acquired data while the data is being acquired. Thus, if it is determined that a particular part of a line needs to be re-shot, those records can be re-shot while the ship is still in the general area. Such real-time data-processing capability would make it economically feasible to re-shoot records when required, thereby increasing the quality of the data.

Accordingly, an improved method of seismic data processing is needed to solve the problems noted above. Such a method preferably could be performed in near-real or real-time while the data is being acquired. Further, the processing method would preferably lower the cost required to process the data. Despite the advantages such a seismic processing system would offer, to date no such system is known to exist.

BRIEF SUMMARY OF THE INVENTION

The deficiencies noted above with the prior art have been solved by a method for analyzing a target seismic trace generally comprising selecting other traces in source-receiver space not including traces from the same shot record that contains the target trace, and comparing those traces to the target trace. The preferred method generally includes setting a distance value indicative of the number of shot gathers to be considered in conjunction with analyzing a target trace, specifying which traces from a plurality of shot records to compare to the target trace based on the distance value, calculating a first amplitude value associated with the amplitude of the target trace, calculating a second amplitude value associated with the amplitudes of the specified comparison traces, and comparing the first amplitude value to the second amplitude value.

The steps of calculating the first and second amplitudes preferably includes calculating the root mean square (RMS) averages of time windowed portions of the target and comparison traces. Further, the median is calculated for all of the RMS averages for the comparison traces for each time window. If the RMS average for the target trace for a given time window is greater than the median of the RMS averages for the comparison traces for the same time window, that portion of the target trace is considered noisy and either removed, set to zero or another predefined value, or otherwise altered to reduce the detrimental effect of the noise.

The preferred method can be implemented in seismic processing system that can be included aboard a seismic ship. Because the method does not require all of the seismic data to be acquired and then sorted, as is the case with many conventional trace editing techniques, the method of the preferred embodiment can be performed in near real or real-time. As such, data quality control is greatly enhanced.

The various characteristics described above, as well as other features and benefits, will be readily apparent to those skilled in the art upon reading the following detailed description of the preferred embodiments of the invention, and by referring to the accompanying drawings.

BRIEF DESCRIPTION OF THE DRAWINGS

A better understanding of the present invention can be obtained when the following detailed description of the preferred embodiments is considered in conjunction with the following drawings, in which.

DETAILED DESCRIPTION OF THE PREFERRED EMBODIMENTS

The method of the preferred embodiment reduces or eliminates noise in seismic data generated from a source external to the seismic system. This method may be employed in a variety of seismic applications such as towed streamer and on-bottom cable (OBC) configurations. Generally, the source of this noise is seismic activity from other seismic ships in the same general vicinity. The method described below is also useful for eliminating or reducing noise with the following properties: high amplitude (higher than the signal), time limited (does not contaminate the whole record), and contaminates different parts of different records.

Figure 1:
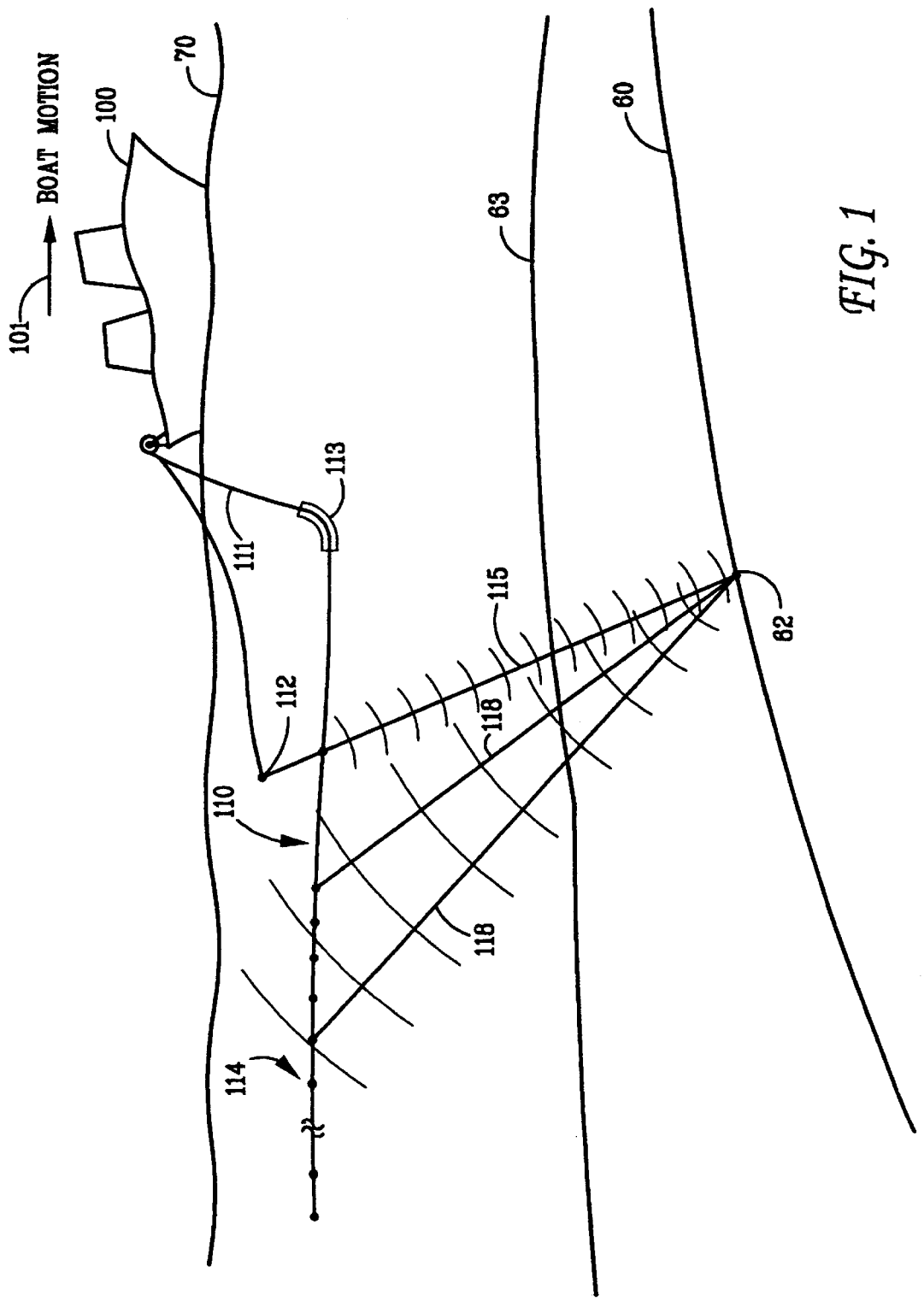
FIG. 1 shows a ship for making seismic measurements with a towed streamer array including a seismic source and multiple receivers.
Figure 2:
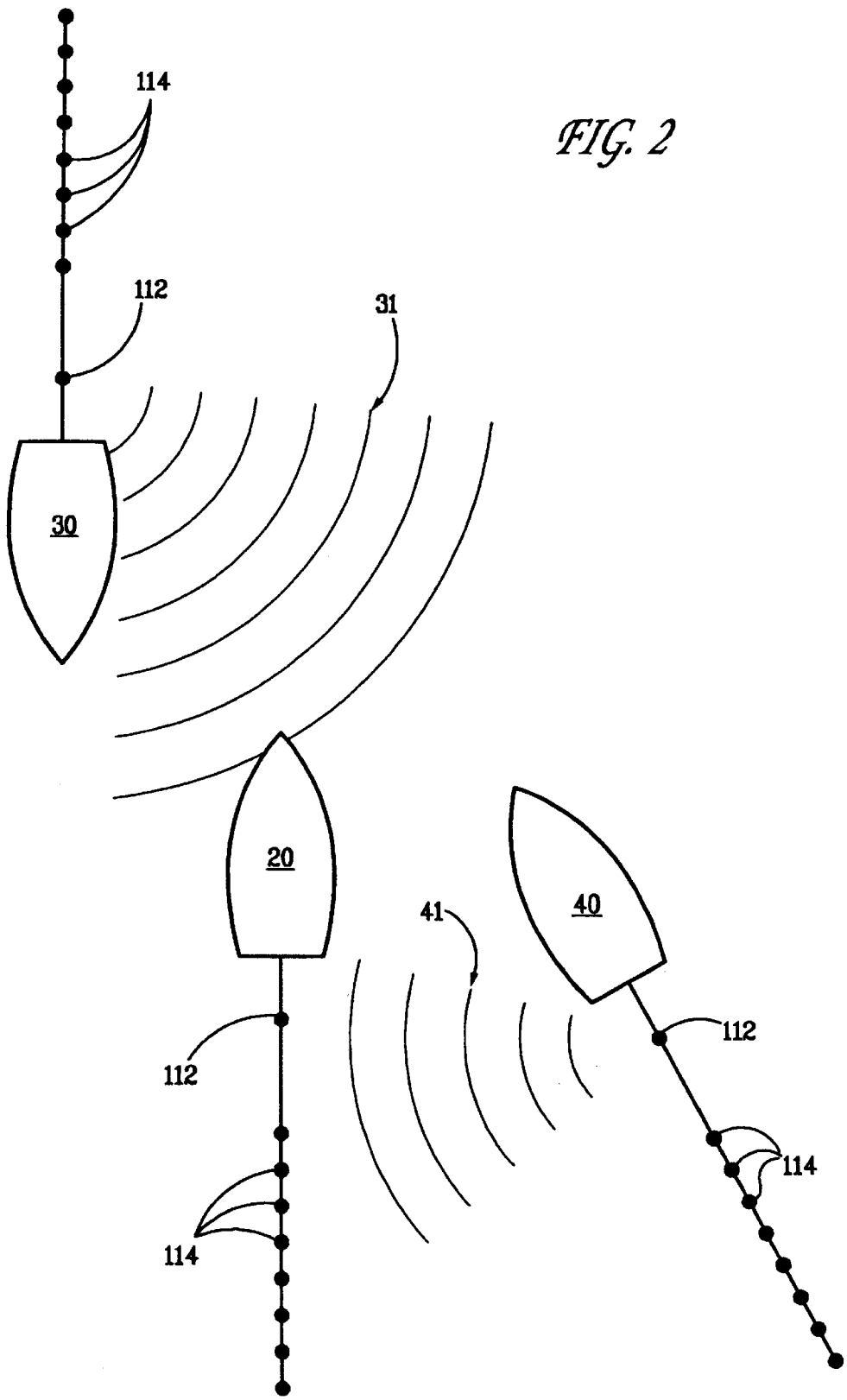
FIG. 2 shows multiple seismic ships in a survey area illustrating the potential for signals originating from one ship to be detected undesirably by receivers on a nearby ship.
Figure 3:
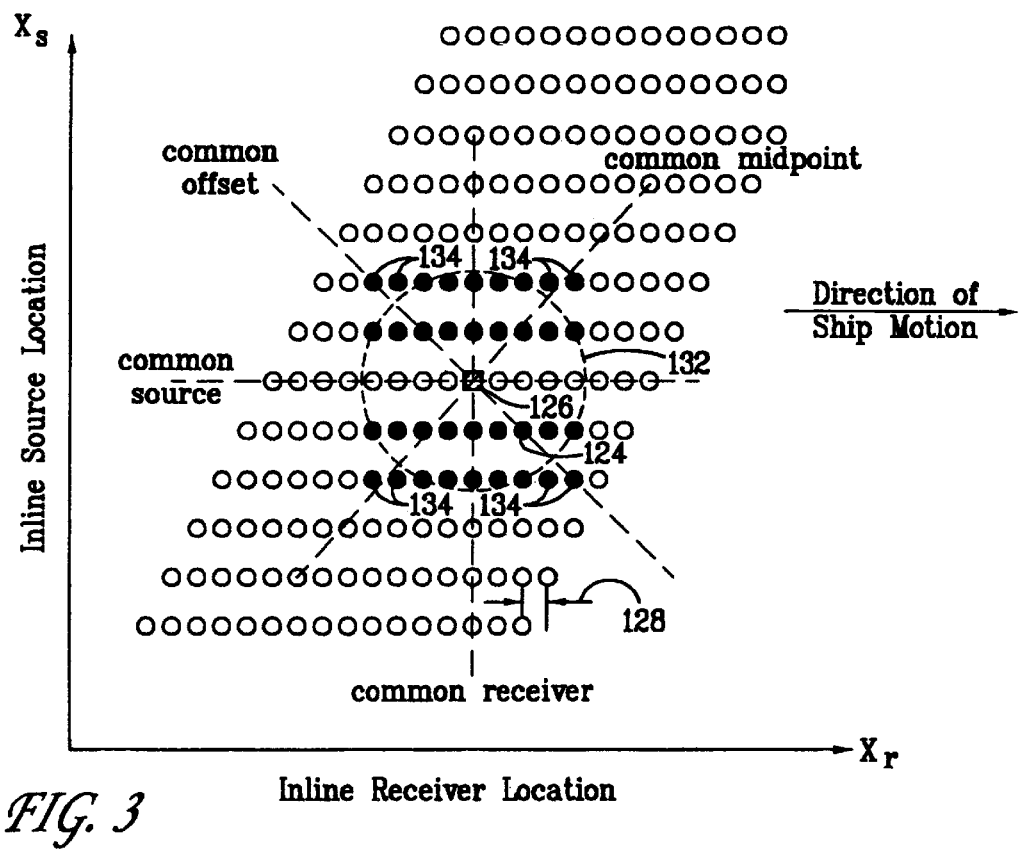
FIG. 3 is a stacking chart showing the method of the preferred embodiment for selecting traces to compare against a target trace.
Figure 4:
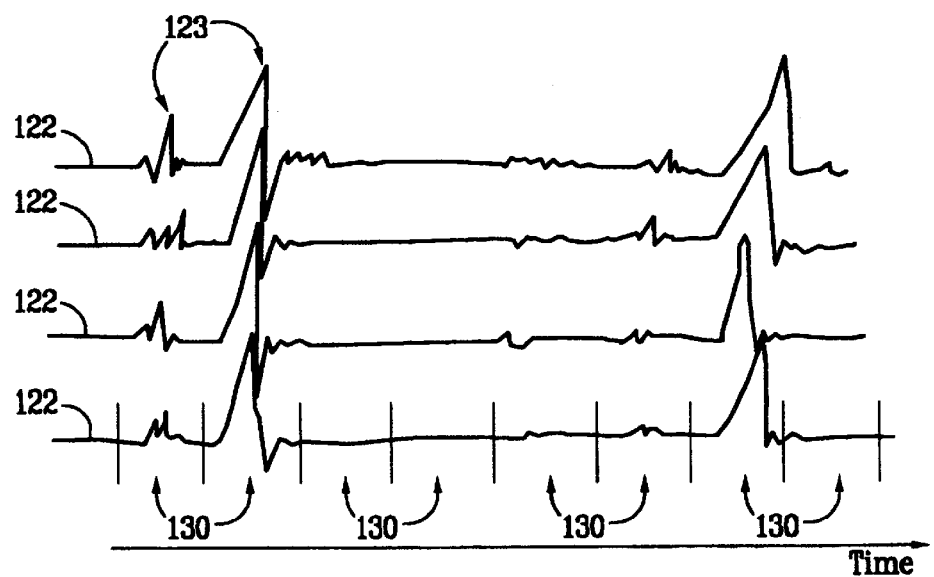
FIG. 4 shows an exemplary set of seismic traces showing how each trace can be divided into two or more time "windows;"

The preferred embodiment of the invention can best be understood by referring to FIG. 3 which shows a "stacking chart." In the stacking chart, each circle 122 represents a trace from a receiver. Portions from four exemplary traces 122 are shown in FIG. 4 and are now explained in conjunction with FIG. 1. Each trace represents the seismic pressure signals detected by a receiver 114 after a source 112 has fired off a shot pulse. Each trace 122 typically represents approximately 8 seconds of data as the seismic signal propagates down through the water, reflects off the ocean floor and various structural interfaces below the ocean floor, and propagates back up to the receivers 114. The various "bumps" or peaks 123 in each trace represent increases in pressure sensed by the receiver caused by reflected signals from the various subsurface interfaces.

Referring to FIG. 3, each row of traces in the stacking chart represent traces taken from a single "shot record." As noted above, a shot record (also called a "shot gather") is the set of traces acquired from all of the receivers 114 in a streamer after a source 112 has fired off a shot impulse. Each row of traces thus represents a shot record initiated at a different point in time than the other shot records in the chart as the ship 100 moves forward in the direction shown at a speed of approximately 4.5 knots. As shown, the stacking chart indicates the location of traces in "source-receiver" space. Moving along the $X_S$ axis indicates a change in source location and consequently a change in shot record. Moving along the in-line receiver axis, $X_r$, indicates a change in receiver location for a given source location or shot record. Each circle in the chart represents a seismic trace, such as that illustrated in FIG. 4.

The streamers may be several miles long and may include hundreds of receivers in each streamer. Because the ship moves relatively slowly and each shot record lasts approximately 8 seconds, many of the trace recordings are taken from receivers located at the same spot in the ocean in different shot records. To aid in viewing the traces, stacking charts, such as that shown in FIG. 3, include the various shot records spaced out along the vertical axis (in-line source location) even though all of the shot records were acquired along the single line of travel of the ship. The distance measured in units of receiver locations and marked with reference numeral 128 in FIG. 3 represents the number of receiver locations the ship traveled from one shot record to the subsequent shot record.

The stacking chart of FIG. 3 represents traces from a 2D survey (i.e., one source and multiple in-line receivers). A 2D stacking chart has been shown for clarity—a 3D stacking chart is difficult to represent graphically. The principles of the present invention, however, are also applicable to 3D seismic data.

In accordance with the preferred embodiment, each trace in the survey is analyzed for the presence of noise. The trace to be analyzed is referred to as the "target" trace. Once a determination is made that noise is present in part or all of a trace, that trace, or at least the "noisy" portion, is modified to reduce the detrimental effect of the noise. In general, the preferred method identifies and removes or minimizes the effect of high amplitude noise in a shot record by comparing each trace in the survey with nearby traces in surrounding shot records. No sorting of traces is required in this method prior to noise editing in contrast to many conventional noise editing techniques. As such, noise editing can be performed in real or near-real time as the data is acquired using the techniques described herein.

The first step in the preferred method is to select the traces for comparing to the target trace to be analyzed for the presence of noise. The selected traces are referred to as "comparison" traces. Referring still to FIG. 3, an exemplary target trace is shown as trace 126 identified by the square surrounding the circular trace representation. The comparison traces that have been selected for comparing to the target trace 126 are shown as traces 124 represented as blackened circles. In accordance with one embodiment of the invention, the comparison traces do not include traces in the same shot record as the target trace. Omitting traces from the same shot record as the target trace is preferred because those traces will likely also be infected with the noise if the target trace is so infected. Accordingly, the comparison traces preferably do not include the traces along the same row of traces as target trace 126. The comparison traces, however, do include traces from shot records taken relatively close in time to the shot record that includes the target trace. Further, the comparison traces within the nearby shot records preferably only include traces taken at receiver locations near the target trace receiver location. As shown in FIG. 3, the comparison traces are taken from two shot records before and after the target record (i.e., the shot record containing the target trace 126). Further, within the selected records, traces within four receiver locations in the $+X_r$ and $-X_r$ directions are selected for comparison to target trace 126. Preferably, the number of shot records to be considered in the analysis before and after the shot record including the target trace, as well as the number of traces selected from those shot records, is variable. The number of traces selected in FIG. 3 represents only one possible set of traces to select.

One way in which to implement this selection step is to use equation (1) below:

$$DIST = \sqrt{(Xst - Xsc)^2 + (Xrt - Xrc)^2} \quad (1)$$

where DIST is the distance (in units of receiver and source locations), Xst is the coordinate of the source location for the target trace 126; Xsc is the coordinate of the source location for a comparison trace; Xrt is the coordinate of the receiver location for the target trace 126; and Xrc is the coordinate of the receiver location for a comparison trace.

Equation (1) generally can be used by setting the variables DIST, Xst, and Xrt to desired values. The remaining two variables, Xsc and Xrc, then define a circle in source-receiver space, such as circle 132 shown in FIG. 3 for a DIST value of 2. As such, any traces with coordinates Xsc and Xrc that fall within the circle 132 defined by equation (1) are used to compare to the target trace. This set of comparison traces preferably omits traces from the same shot record as the target trace, as noted above.

Equation (1) preferably is used by computing the distance, DIST, between a target trace with source location, Xst, and receiver coordinate, Xrt, and a comparison trace with source location, Xsc, and receiver location Xrc. The comparison trace is selected if DIST is less than a user-specified search distance. Because this method of selecting comparison traces works directly on shot records without first requiring sorting (although the records could be sorted if desired), it can be run at sea in real or near real-time during data acquisition.

In accordance with the preferred embodiment, the coordinates of the source and receivers are determined using well-known navigational equipment. The coordinates of the source and receivers preferably are recorded with each shot record. If, however, navigation-based coordinates are unavailable, the operator of the system can specify nominal geometry parameters for the shot records.

A software embodiment using 2D equation (1) is included in the Microfiche Appendix (MULTIEDIT™) attached to the end of this disclosure. The MULTIEDIT™ software, as well as the companion 3D MEGAEDIT™ software also included in the appendix, preferably runs in the ProMAX seismic processing environment (Advance Geophysical), but the software can be easily adapted to other processing systems now known or later developed. This system runs under any of numerous versions of the Unix operating system, typically on "mid-range" work stations, but also on larger "main frame" machines. For example, the software can be run on an IBM RS6000 running the AIX 4.1.5 operating system (IBM). The code can also run on any of other varieties of the Unix operating systems that are supported by Advance Geophysical, such as Solaris (Sun Microsystem) and IRIX (Silicon Graphics).

Figure 5:
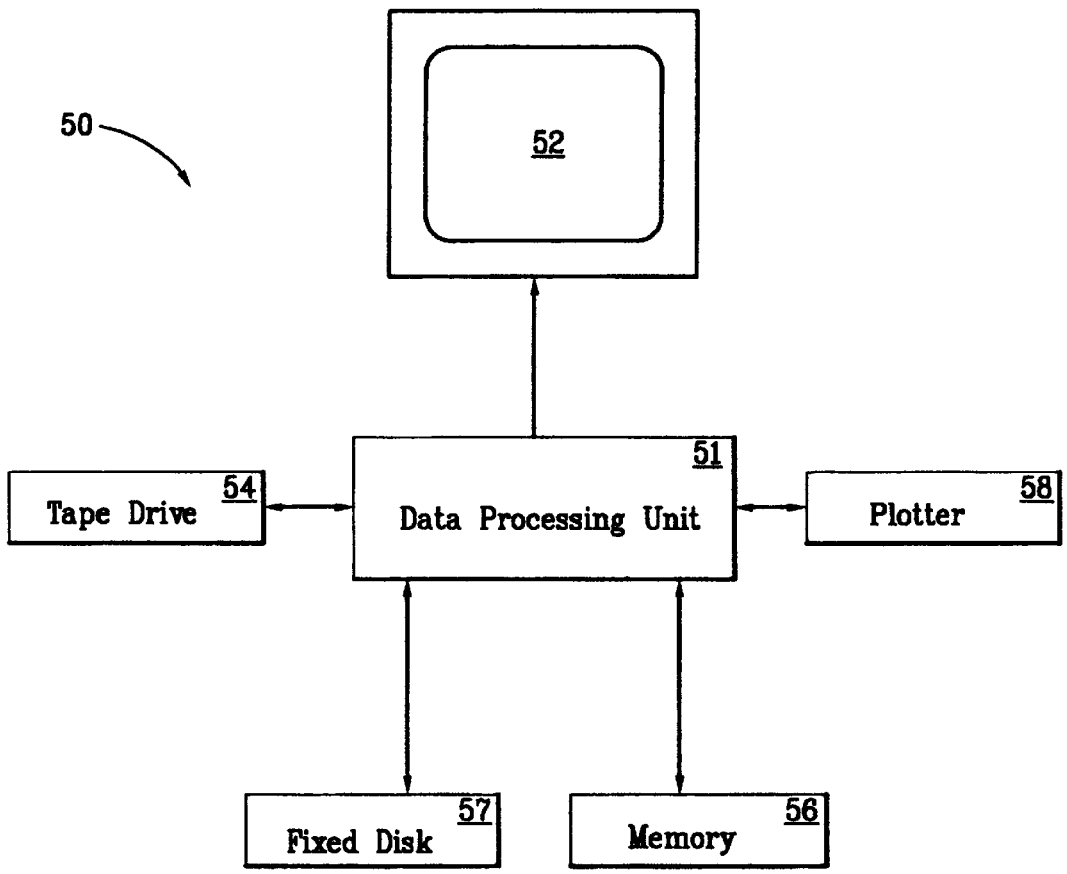
FIG. 5 is a block diagram of the seismic processing system constructed in accordance with the preferred embodiment.

Referring to FIG. 5, seismic processing system 50 constructed in accordance with the preferred embodiment generally includes a data processing unit 51, a display 52, a tape drive 54, memory 56, and a fixed disk storage device 57. A plotter 58 for generating hard copies of the processed data is optional, but if included preferably comprises a large format 12, 24, or 36 inch plotter such as GS-636 manufactured by Oyo, or any other suitable printing or plotting device.

The data processing unit 51 may include a 72 MHZ, IBM RS6000 7013-590 CPU, but faster and higher performance CPU's are preferred. The display can be any suitable display such as the 6091 19 manufactured by IBM. The memory 56 includes any suitable type of memory such as dynamic random access memory (DRAM). Memory 56 preferably is implemented with at least 256 MB, but 500 MB, or more, is preferred. Less than 256 MB is also acceptable although with diminished performance. The fixed disk 57 preferably has a capacity of 20–30 GB and may comprise a conventional hard drive, CD ROM drive, or other suitable types of mass storage units. The tape drive 54 preferably comprises a 8mm high density tape drive such as the 850S manufactured by Exabyte.

Referring again to FIG. 3, other traces falling outside the circle 132 defined by equation (1) can also be used to compare to target trace 124. For example, as shown in FIG. 3 traces 134 may also be included if desired. Moreover, the comparison traces determined by equation (1) are only a preferred set of traces as other traces can be included and some of the traces that would otherwise be selected using equation (1) can be omitted from the analysis as desired. Further, the noise arrival times may vary slowly between shots thereby contaminating more than one adjacent shot record with the noise at a similar trace time. To handle such cases, the MULTIEDIT™ (and MEGAEDIT™) software preferably includes an option to exclude shots from the trace selection. It is contemplated that this feature will be used whenever the noise arrival time changes by less than the length of the noise wave train from one shot to the next.

Figure 6:
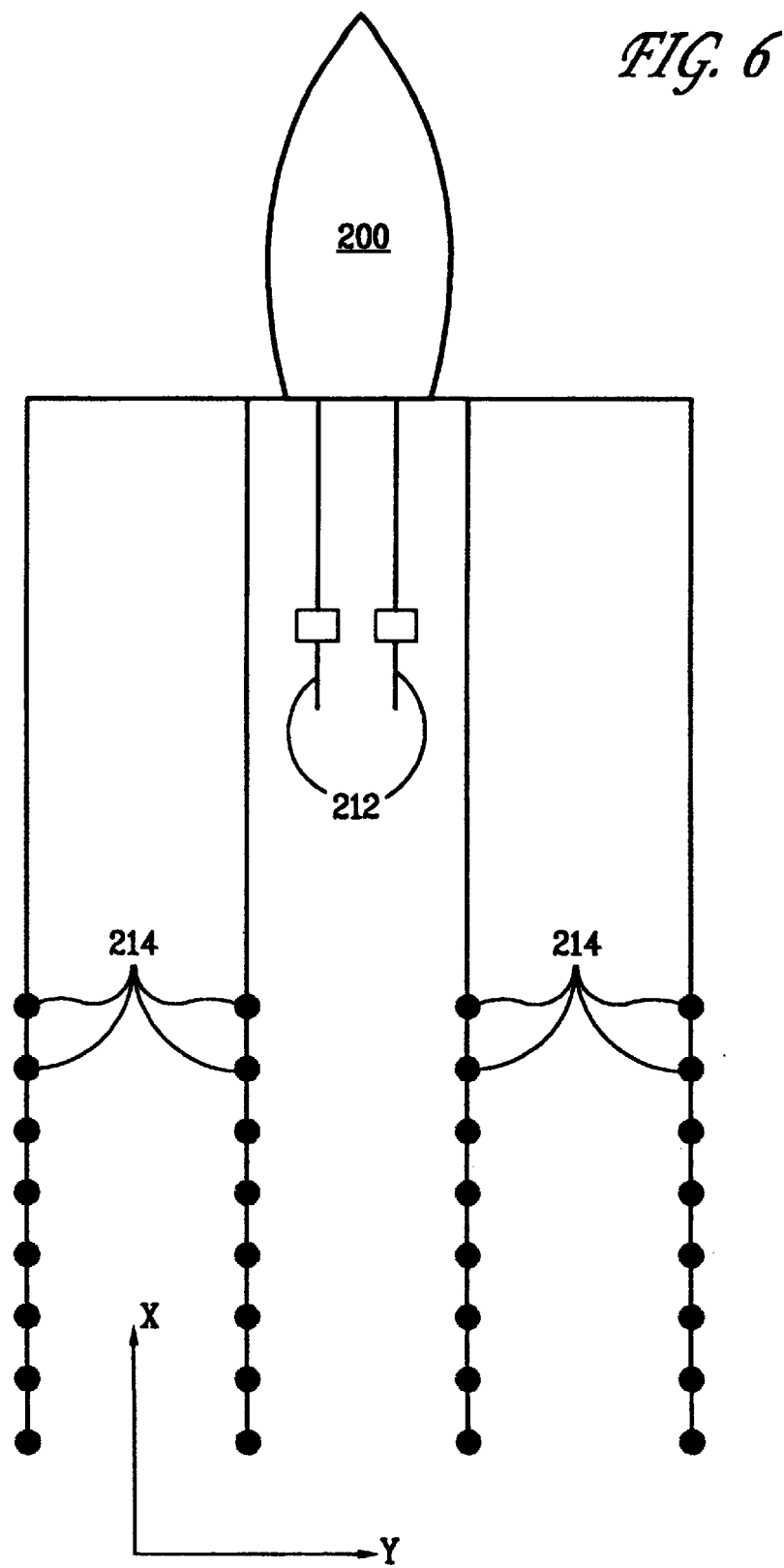
FIG. 6 shows a seismic ship configured for 3D seismic data acquisition.

Referring now to FIG. 6, a 3D seismic ship 200 is shown trailing two sources 212 and four streamers of receivers 214 so as to acquire 3D seismic data. Two axes X and Y are shown in FIG. 6. The X axis corresponds to the in-line X axis of FIG. 3. The horizontal Y axis is the "cross-line" axis and is used when referring to multiple streamers of receivers and to multiple sources. As such, each receiver 214 in FIG. 6 is located by a coordinate (Xr,Yr) and each source 212 is located by coordinate (Xs,Ys).

In a 3D seismic survey, equation (1) can be modified to provide for the possibility of multiple sources and multiple streamers of receivers. For example, equation (2) below can be used to determine a set of comparison traces for comparing with the target trace in a 3D seismic survey:

$$DIST = \sqrt{(Xst - Xsc)^2 + (Yst - Ysc)^2 + (Xrt - Xrc)^2 + (Yrt - Yrc)^2} \quad (2)$$

where DIST, Xst, Xsc, Xrt, and Xrc refer to the same quantities as in equation (1). Further, Yst is the cross-line coordinate of the source location for a target trace, Ysc is the cross-line coordinate of a source location pertaining to a comparison trace; Yrt is the cross-line coordinate of the receiver location for a target trace; and Yrc is the cross-line coordinate of the receiver location for a comparison trace.

Equation (2) generally defines a hypersphere in four dimensional source-receiver space that includes traces generated by the same or different sources 212. As with the 2D case, the traces selected in the 3D case for comparison to a target trace preferably do not include traces from the same shot record which produced the target trace. This selection methodology permits traces from other streamers to be compared with the target trace. An exemplary software implementation using equation (2) is provided in the Microfiche Appendix (MEGAEDIT™).

The second step of the preferred method involves editing the target trace. In accordance with the preferred embodiment of the invention, and referring again to FIG. 4, noise editing of a target trace is based on a suitable amplitude measure, such as the root mean square (RMS) amplitude, computed in time windows 130 for each trace. Other types of averages, such as average absolute amplitude, can also be used if desired. The RMS average of the target trace in each time window is compared to the median of the RMS averages of the comparison traces from the comparable time windows. Generally, at least three comparison traces are needed to compute the median value. That is, the RMS average is computed for each time window in the comparison traces and then the median is computed of the RMS averages for all of the comparison traces in each time window. If the RMS average of the target trace in a given time window exceeds the comparison traces' median value by more than a user-specified threshold factor, that window in the target trace is classified as noise and flagged for removal or other suitable processing. The threshold factor may be time-variant and user-adjustable. Further, the windows 130 in which the RMS and median values are calculated can be any desirable size. In accordance with the preferred embodiment, these windows preferably are in the range of 100 to 200 milliseconds, although other window sizes also are possible. Additionally, the windows need not be back-to-back as shown in FIG. 4. Instead, each window may overlap an adjacent window. For example, a typical window length may be 100–200 milliseconds with a corresponding amplitude window increment of 50–100 milliseconds (overlapping).

Noise zones flagged for removal may be muted, replaced with a constant value, replaced with data interpolated from surrounding traces, or modified in any suitable manner so as to reduce the detrimental effect of the noise. Additionally, a suitable linear taper function can be applied at the start and end of the noise zone so as to minimize the amount of high frequency harmonics added to the data, as would be understood by one skilled in the art.

The number of traces inside the hypersphere defined by equation (2) can be quite large (several hundred) even for a short search distance of two or three shot intervals. Computing the median of so many values may be time-consuming and, in many cases, unnecessary. Thus, the exemplary 3D software embodiment MEGAEDIT™ preferably includes an option for decreased runtime by computing medians from a subset of the full set of comparison traces. As the software listing indicates, a user-specified "maximum number of traces" value can be selected uniformly from the full set of comparison traces, so that the subset covers approximately the same region of source-receiver space as the full set. The median value computed from a few tens of traces is not likely to differ significantly from the median computed from a few hundred traces, as long as the comparison traces cover substantially the same part of the source-receiver space. However, the time required to sort a few tens of amplitudes is much smaller than the time required to sort several hundred amplitudes because most sorting algorithms have run times proportional to a quantity between N and $N^2$ depending on the number and initial order of the values, as would be understood by one of ordinary skill.

Figure 7:
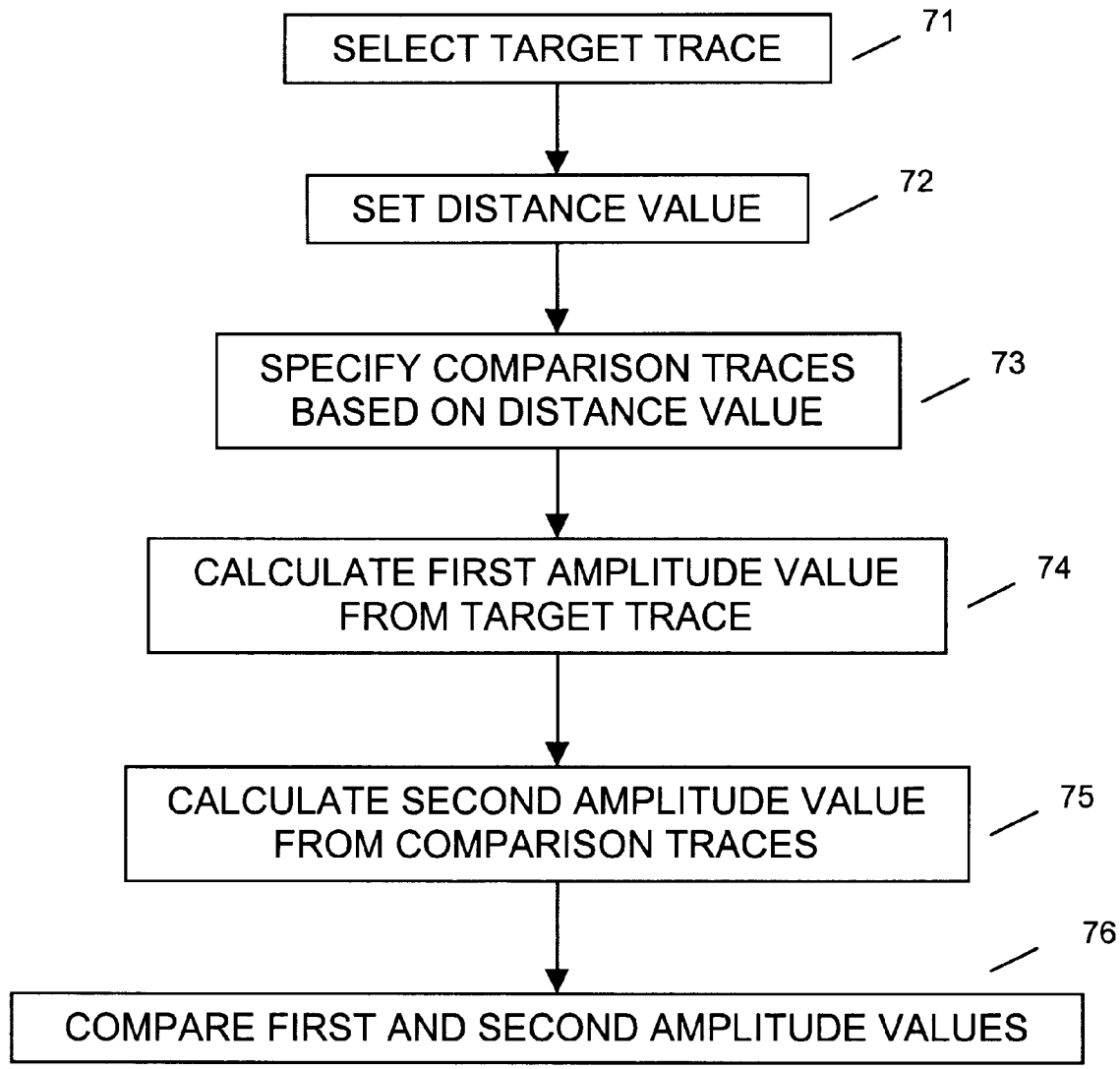
FIG. 7 shows a flow chart illustrating the method of the preferred embodiment of the present invention for analyzing seismic data for noise.

FIG. 7 shows a flow chart illustrating the method of the preferred embodiment of the present invention for analyzing seismic data for noise. First, at step 71, a target trace is selected to be analyzed. Next, at step 72, a distance value is set which is indicative of the number of shot gathers to be considered in conjunction with analyzing the target trace. Next, at step 73, traces from a plurality of shot records to compare to the target trace are specified based on the distance value. Preferably, traces from the shot record that contains the target trace are omitted. Next, at step 74, a first amplitude value associated with the amplitude of the target trace is calculated. Next, at step 75, a second amplitude value associated with the amplitudes of the specified comparison traces is calculated. Last, at step 76, the first amplitude value is compared to the second amplitude value.

Figure 8:
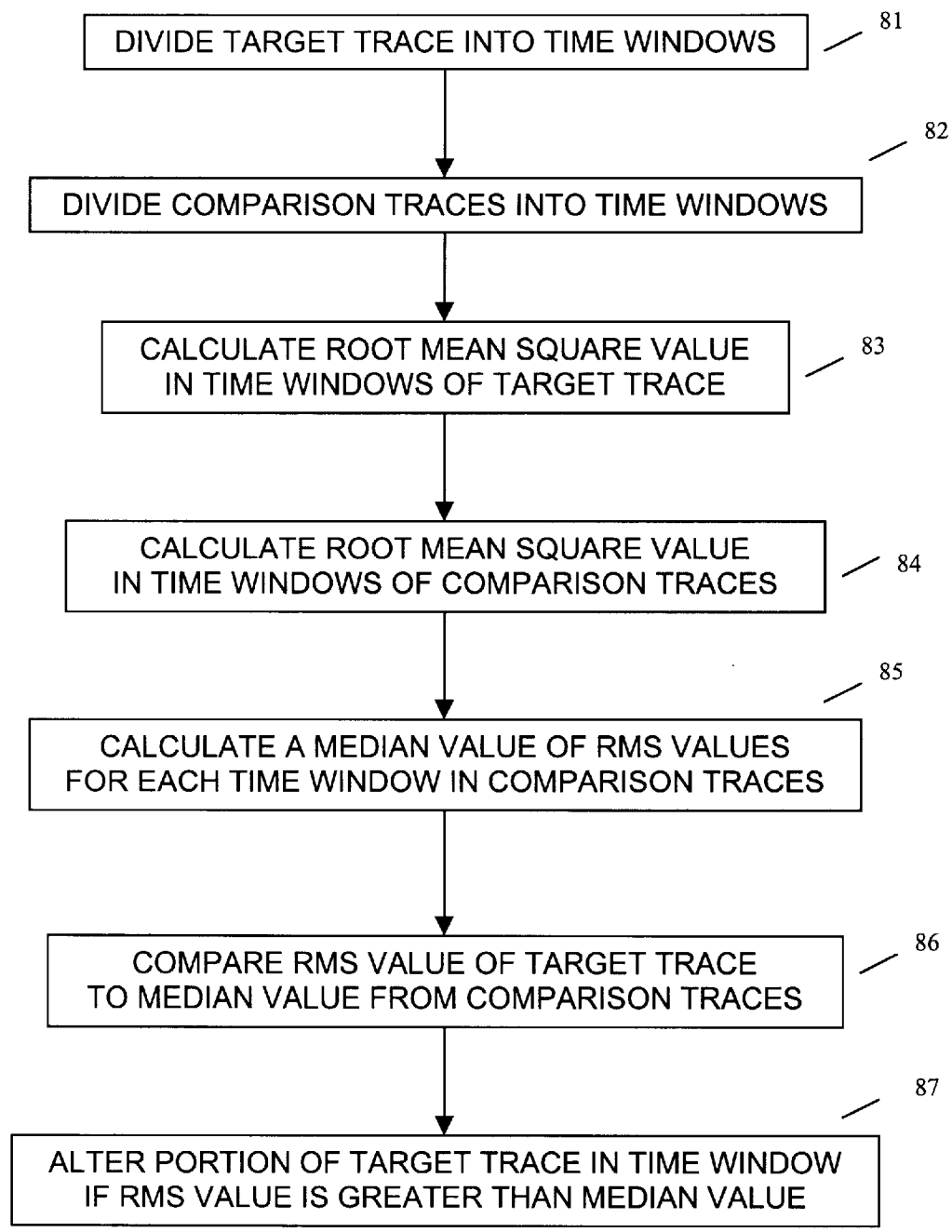
FIG. 8 shows a flow chart illustrating the method of the preferred embodiment for calculating and comparing the first and second amplitude values.

FIG. 8 shows a flow chart illustrating the method of the preferred embodiment for calculating and comparing the first and second amplitude values. First, at step 81, the target trace is divided into at least two time windows. Next, at step 82, each comparison trace is divided into at least two time windows. Next, at step 83, a root mean square value is calculated in each time window in the target trace. Next, at step 84, a root mean square value is calculated in each time window in each of the comparison traces. Next, at step 85, a median value is calculated for at least three of the comparison trace RMS values associated with a given time window. Next, at step 86, an RMS value from the target trace is compared to the median value. Finally, at step 87, a portion of the target trace in the time window is altered if the RMS value for that portion is substantially greater than a median value of the RMS values of comparable portions of the selected comparison traces.

The MULTIEDIT™ or MEGAEDIT™ programs can be run at sea during data acquisition or on land after the survey has completed. Alternatively, part of the processing can be performed on board the ship during acquisition and part can be performed post data acquisition (on land). For example, the steps to determine which traces have been infected with noise can be performed during the data acquisition phase.

Then, after the survey is over, the noisy traces can be edited in a data processing system on land.

Additionally, the computed edits can be mapped as attributes in a conventional binning system in which the trace locations can be analyzed. Common depth point gathers determined to have excessive noise using the techniques described above can be evaluated in the binning system. Upon viewing the system, a decision can be made to reshoot an area with a large congregation of edits.

The preferred embodiments of the invention described above provide significant advantages over conventional marine seismic acquisition and processing systems. For example, no pre-noise analysis sorting is required. This permits the noise editing of the preferred embodiments to occur in real-time, or at least in near real-time, relative to the rate at which the data is acquired. As such, the noise editing of the preferred embodiments can be performed on-board the ship while the data is being acquired. The ability to analyze the data for noise while the data is being acquired greatly enhances the quality control of the data. If, for example, portions of a seismic line are fatally defective due to the presence of high amplitude noise, the seismic operator can make that determination while the ship is still in the same general vicinity of the ocean where the noisy shot record was acquired. Accordingly, parts of a line can be reshot before the ship leaves the area if desired. Conventional seismic acquisition systems do not permit such near real-time data analysis and thus re-shooting shot records generally becomes prohibitively expensive. The quality of the data is greatly enhanced over conventional seismic systems.

Numerous variations and modifications will become apparent to those skilled in the art once the above disclosure is fully appreciated. It is intended that the following claims be interpreted to embrace all such variations and modifications.

What is claimed is:

1. A method for analyzing a target seismic trace, comprising the steps of:

setting a distance value indicative of the number of shot gathers to be considered in conjunction with analyzing the target trace;

specifying which traces from a plurality of shot gathers not containing the target trace to compare to the target trace based on the distance value;

calculating a first amplitude value associated with the amplitude of the target trace;

calculating a second amplitude value associated with the amplitudes of said specified comparison traces;

comparing said first amplitude value to said second amplitude value; and editing the target trace based upon the comparison.

2. The method of claim 1 wherein said first amplitude value comprises calculating an absolute amplitude measure.

3. The method of claim 1 wherein said first amplitude value comprises calculating an RMS value of data points in said target trace.

4. The method of claim 1 wherein said calculating steps are performed on a portion of the data points in said target and comparison traces.

5. The method of claim 1 further including dividing said target traces into at least two time windows and calculating an RMS value for the data points in each window.

6. The method of claim 5 further including dividing said comparison traces into at least two time windows for each comparison trace and calculating an RMS value for the data points in each comparison trace time window.

7. The method of claim 6 further including calculating a median value for at least three of the comparison trace RMS values associated with a given time window.

8. The method of claim 7 wherein said comparing step comprises comparing an RMS value from the target trace to the median value.

9. The method of claim 6 further including calculating a median value for all of the comparison trace RMS values associated with a given time window.

10. The method of claim 9 wherein said comparing step comprises comparing an RMS value from the target trace to the median value.

11. A method for selecting seismic traces for analyzing the noise content of a target trace comprising:

selecting traces from shot records located within a predetermined distance of the shot record containing the target trace;

omitting during the selecting step traces from the shot record that contains the target trace;

comparing the relative amplitude of said selected traces to said target trace.

12. The method of claim 11 wherein said selecting step also includes, for a given selected shot record selecting traces from that shot record that are located within another predetermined distance from the target trace.

13. The method of claim 12 wherein comparing step includes calculating and comparing an RMS average associated with said target trace to a median of RMS averages associated with said selected traces.

14. The method of claim 11 wherein said predetermined distance defines a circle in shot-receiver space for a 2-D seismic survey.

15. The method of claim 11 wherein said predetermined distance defines a hypersphere in four dimensional shot-receiver space for a 3-D seismic survey.

16. A computer readable storage medium for storing an executable set of software instructions which, when inserted into a host computer system, is capable of controlling the operation of the host computer, said software instructions being operable to process traces from a target shot record, comprising:

a means for selecting traces from at least one nearby shot record;

a means for comparing the amplitude of target traces in the target shot record with the amplitudes of traces from the nearby shot records.

17. The invention of claim 16 wherein said means for selecting traces includes omitting traces from the target shot record.

18. The invention of claim 17 wherein said means for selecting traces includes selecting traces within a predetermined distance in the source-receiver domain from the target trace.

calculating a first amplitude value associated with the amplitude of the target trace;

calculating a second amplitude value associated with amplitudes of said specified comparison traces;

comparing said first amplitude value to said second amplitude value; and editing the target trace based upon the comparison.

19. A seismic processing system, comprising:

a computer; and a tape drive coupled to said computer;

wherein said computer retrieves seismic traces from said tape drive and selects traces from shot records that do not contain a target trace to be analyzed for the presence of noise and said selected traces are located within a predetermined distance, measured in source-receiver space, from the shot record that contains the target trace and said computer compares the target trace to said selected traces and edits the target trace based upon the comparison.

20. The seismic processing system of claim 19 wherein said computer further compares an RMS average associated with said target trace with a median of RMS averages associated with said selected traces.

21. The seismic processing system of claim 19 wherein said computer further calculates an RMS average for portions of said target trace, calculates RMS averages for comparable portions of said selected traces, calculates median values of said selected traces RMS averages and compares said median values to said target trace RMS averages.

22. The seismic processing system of claim 21 wherein said computer alters a portion of said target trace if the RMS average for that portion is substantially greater than a median value of the RMS averages of comparable portions of said selected traces.

* * * * *